United States Patent [19]

Maglica

[11] 4,388,673
[45] Jun. 14, 1983

[54] VARIABLE LIGHT BEAM FLASHLIGHT AND RECHARGING UNIT
[75] Inventor: Anthony Maglica, Ontario, Calif.
[73] Assignee: Mag Instrument, Inc., Ontario, Calif.
[21] Appl. No.: 275,877
[22] Filed: Jun. 22, 1981
[51] Int. Cl.³ .............................................. F21L 7/00
[52] U.S. Cl. ................................... 362/183; 362/188; 362/202; 362/205; 362/253
[58] Field of Search ............... 362/183, 188, 202, 205, 362/253

[56] References Cited
U.S. PATENT DOCUMENTS
4,286,311  8/1981  Maglica .............................. 362/205

Primary Examiner—Stephen J. Lechert, Jr
Attorney, Agent, or Firm—Paul L. Gardner

[57] ABSTRACT

The flashlight of the invention includes an improved mechanism for selectively varying the light beam intensity and area. The mechanism includes a cam member, and abutting head and outer switch housing shoulders, which enable movement of the bulb forwardly and rearwardly relative to the light reflector by rotation of the head of the flashlight, so as to selectively vary the intensity and area of the light beam, while preventing axial movement of the head and light reflector. The flashlight includes structural means for recharging its battery; and a battery charger/flashlight holder is designed to retain the flashlight and charge the batteries when the flashlight is stored therein. A shield in the lens prevents damage from heat emitted by a high intensity halogen bulb.

11 Claims, 6 Drawing Figures

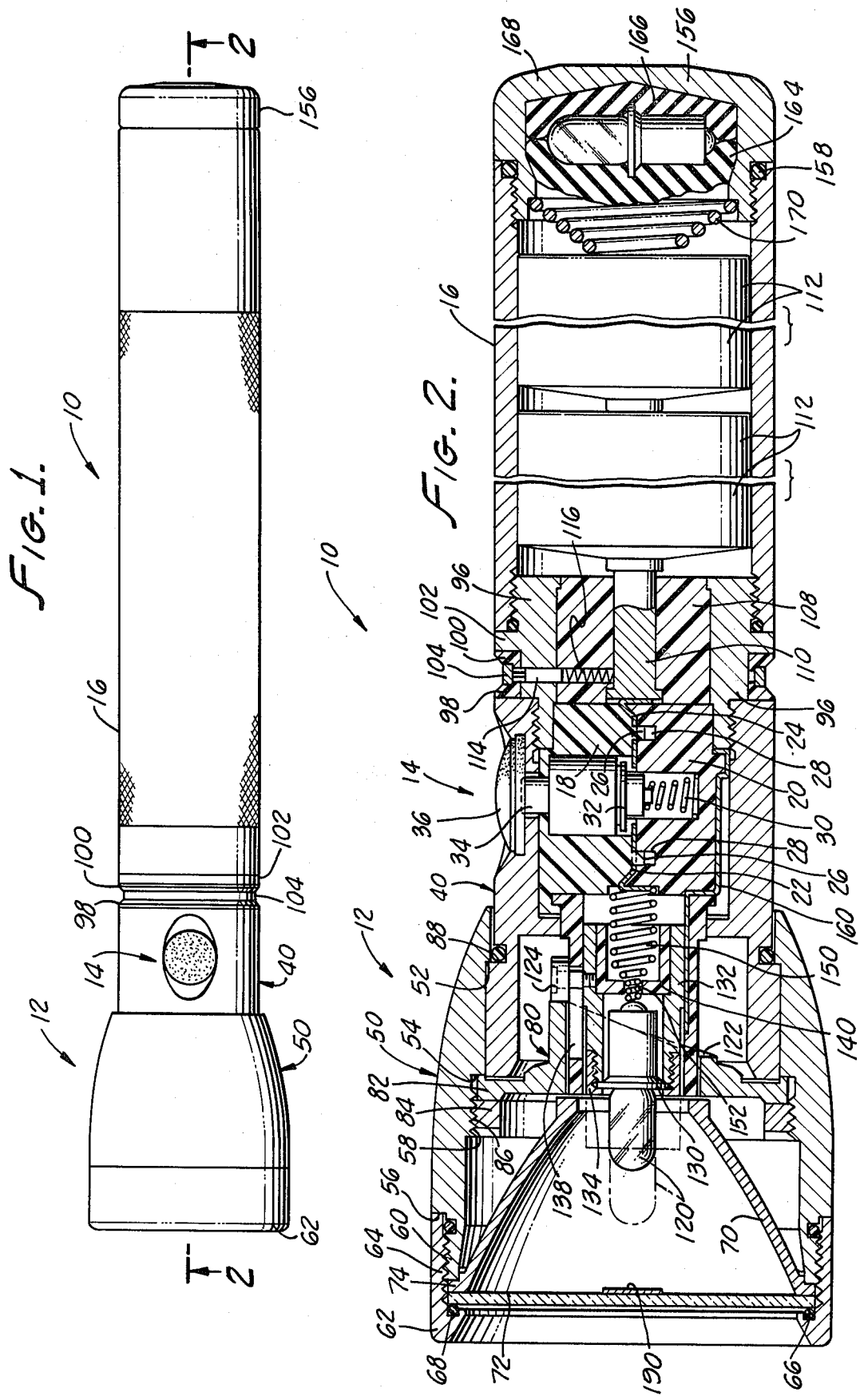

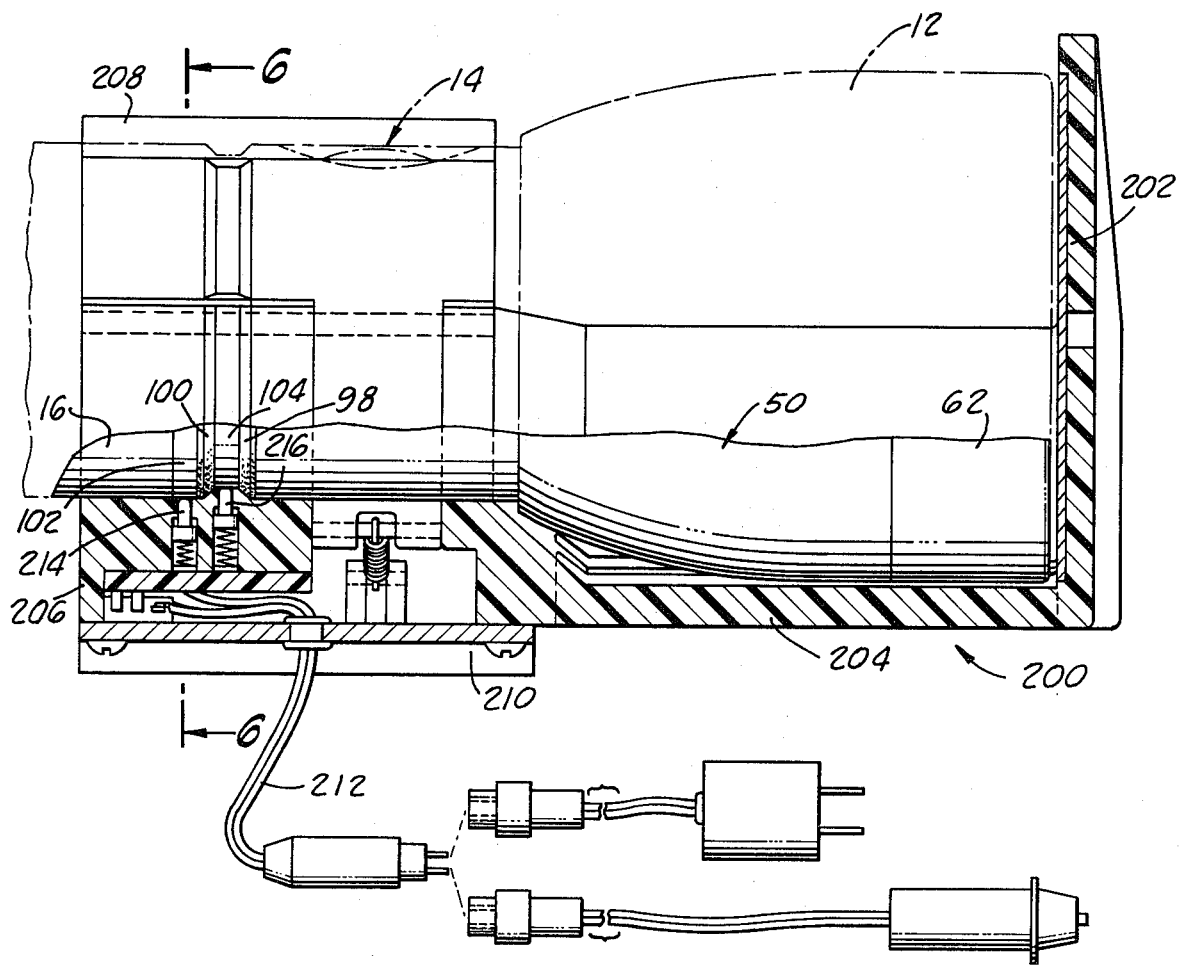
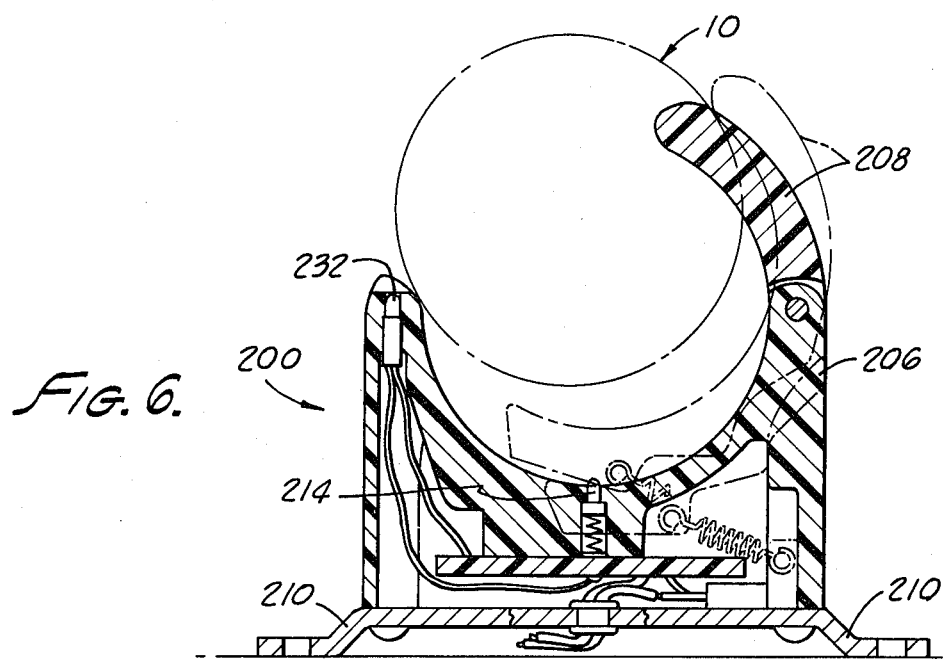

VARIABLE LIGHT BEAM FLASHLIGHT AND RECHARGING UNIT

FIELD OF THE INVENTION

The present invention relates to flashlights. More specifically, the invention relates to an improved flashlight and a combination flashlight holder/battery charger in which the flashlight is adapted to be stored between uses.

BACKGROUND OF THE INVENTION

The closest prior art of which the inventor is aware is his prior U.S. Pat. No. 4,286,311 (Anthony Maglica, "Flashlight", Ser. No. 968,468, filed Dec. 11, 1978). The flashlight described includes an adjustable light beam which may be focused by axially moving the bulb relative to the light reflector. The head mechanism includes a rotatable head member, a light reflector having a central opening, and having a cam surface extending rearwardly from the rear portion, a bulb carrier sleeve, axially movable through the central opening in the light reflector, and a cam follower roller, connected to the bulb carrier sleeve. When the head member is rotated through less than one revolution, the cam follower roller follows the light reflector cam surface, and the bulb carrier sleeve and bulb move axially relative to the light reflector, so as to adjust the light beam between a narrow or spot beam and a broad or flood beam.

The light reflector, moves axially during rotation of the head member, by virtue of its screw thread connection to the head member, affecting the desired axial movement of the bulb relative to the light reflector for adjustment of the light beam. Rechargeable batteries are an efficient power source for use with such a flashlight, and such batteries may be conveniently used in conjunction with a system for recharging the batteries while the batteries are in the flashlight. Further, a high intensity bulb, such as a halogen bulb, is an efficient light source for use with such a flashlight. Such bulbs, however, generate substantial quantities of heat, which may damage an unprotected lens, particularly in an adjustable beam flashlight where the bulb is axially movable into close proximity with the lens.

OBJECTIONS OF THE INVENTION

The broad object of the present invention is to provide a flashlight wherein the intensity and cross-sectional area of the light beam may be selectively varied in an improved manner, and wherein the flashlight structure is simpler and less expensive to manufacture.

A further object of the present invention is to provide a battery charger/flashlight holder which will accomplish the dual function of storing the flashlight between uses, and maintaining the rechargeable batteries in a fully charged condition.

A still further object of the present invention is to provide protective structure for preventing heat damage to a flashlight lens from use of a halogen bulb.

SUMMARY OF THE INVENTION

The foregoing and other advantages of the present invention are realized by the flashlight and battery charger/flashlight holder described below. The light beam from the flashlight of the present invention may be selectively varied in intensity and area by rotating the head of the flashlight to rotate a cam element retained in the head. As the head, light reflector, and separate cam element are rotated while being constrained against movement in the axial direction, a cam follower connected to a bulb holder rides against the cam surface of the cam element. The bulb moves forwardly and rearwardly, relative to the axially-stationary parabolic reflector, so as to vary the beam.

The flashlight of the present invention further includes an electric circuit having a diode between a first external contact and an internal conductor, the internal conductor being electrically connected to batteries in the flashlight casing when the batteries are in place. The flashlight electric circuit further includes a ground connection, including a second external contact, and an internal ground connection. The first and second external contacts on the flashlight are adapted to be in electrical contact with the contacts of a battery charger in the bracket of a flashlight holder. The contacts of the charger are selectively connected to a source of alternating current. The holder may be mounted, for example, on the dashboard of an automobile. The battery charger may be powered, for example, by the alternator of the automobile.

The foregoing and other objects and advantages of the present invention will become apparent from a review of the detailed description of a preferred embodiment, below, and the accompanying drawings to which the detailed description refers.

BRIEF DESCRIPTION OF THE DRAWINGS

In the accompanying drawings:

FIG. 1 is a side elevation view of the exterior of a flashlight constructed in accordance with the teachings of the present invention.

FIG. 2 is a cross-section of the flashlight shown in FIG. 1, taken along the plane 2—2 of FIG. 1 and looking in the direction of the arrows. FIG. 2 is enlarged, relative to FIG. 1, and unessential lengths in the battery storage area of the flashlight have been cut away for convenience in illustrating the interior of the flashlight construction.

FIG. 5 is a side cross-section elevation view of the holder/charger shown in FIG. 3, showing the flashlight in phantom lines, and alternate plug adapters.

FIG. 6 is a cross-section of the flashlight and holder/charger shown in FIG. 5, taken along the plane 6—6 of FIG. 5, and looking in the direction of the arrows.

DETAILED DESCRIPTION OF PREFERRED EMBODIMENTS

Figure 3:
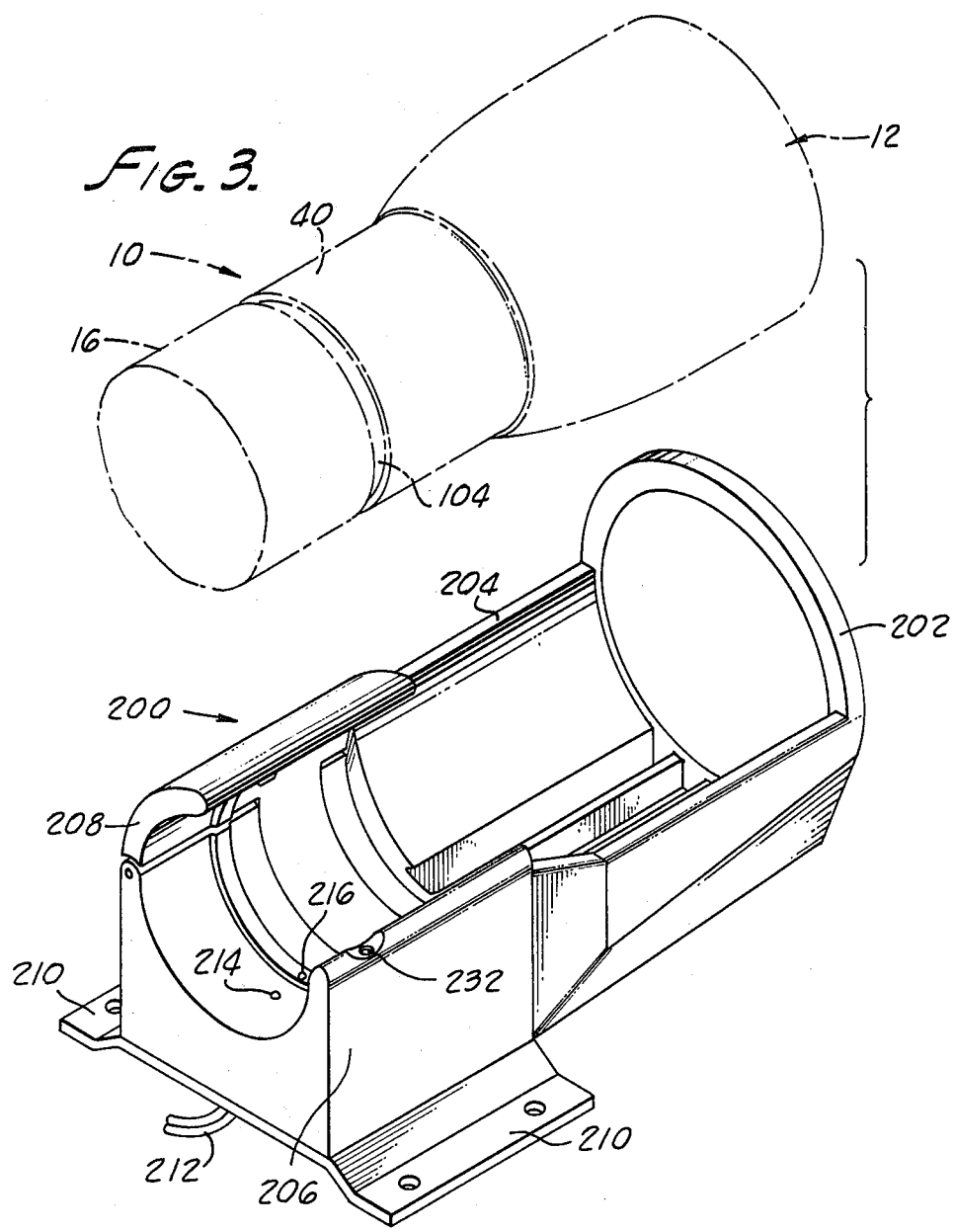
FIG. 3 is a perspective view of a flashlight holder/battery charger constructed in accordance with the teachings of the present invention, with the forward portion of the flashlight of FIG. 1 shown in phantom lines.

The flashlight 10 of the present invention is best illustrated in FIG. 2 of the accompanying drawings.

The flashlight 10 includes a head portion 12, a switch assembly 14, and a casing 16.

The switch assembly 14 comprises an upper housing section 18 and lower housing section 20 preferably constructed of a plastic material having high dielectric properties. A forward conductor strip 22 and a rear conductor strip 24 are sandwiched between the housing sections and are maintained in substantially longitudinal alignment by projections 26, 26 on the interior face of the upper housing section 18 which extend through holes in the conductor strips 22, 24 and into openings 28, 28 in the mating face of the lower housing section 20.

A coil spring 30 disposed in a cavity in the lower housing section 20 normally urges an annular contact member 32 to the position shown in FIG. 2, wherein it is spaced from the contact strips 22, 24. The annular contact member 32 may be brought into bridging contact with the strips 22, 24 by depressing a plunger 34 which is disposed beneath a rubber diaphragm 36.

Reference is made to applicant's U.S. Pat. No. 4,286,311 for a detailed description and drawings of the interior of switch assembly 14. It is contemplated, however, that numerous other switch constructions could be employed in the flashlight of the present invention; the switch assembly 14 is exemplary only and does not constitute part of the invention, per se, of this patent.

The switch assembly 14 further includes a generally tubular cylindrical outer housing 40 within which the upper and lower sections 18, 20 are disposed. The rear end of the housing 40 is screwed into the forward end of the casing 16. The forward end of the switch housing 40 is received in the rear end portion of a tubular head 12 which is rotatably mounted thereon.

The head 12 of the flashlight 10 includes generally tubular housing 50 having an interior shoulder 52 adjacent its rear end, an interior shoulder 54 in its intermediate portion and an external shoulder 56 near its forward end. The head housing 50 includes interior screw threads 58 in its intermediate portion (just forwardly of the intermediate shoulder 54), and external threads 60 adjacent its forward end. A generally annular cap member 62 having internal threads 64 is screwed on to the forward end of the head housing 50. The forward end portion of the cap 62 includes a rearwardly facing groove 66 which retains an O-ring sealing member 68.

A parabolic reflector 70 is disposed in the forward end of the head housing 50; and a glass or plastic disc 72 is retained against the forward end of the reflector 70. The reflector 70 includes an annular flange 74 which is sandwiched between the forward end of the head housing 50 and the periphery of the transparent disc 72. The transparent disc 72 and the reflector 70 are retained in place between the O-ring 68 and the forward end of the head housing 50 by means of the cooperating screw threads on the cap 62 and the forward end of the head housing 50.

A camming member 80 has its periphery 82 retained against the forwardly-facing shoulder 54 within the intermediate portion of the head housing 50 by means of a retaining ring 84 having external threads 86 which mate with the internal threads 58 within the intermediate portion of the head housing 50. It may thus be appreciated that the camming member 80 will rotate with the head housing 50 when the head housing 50 is rotated on the forward end portion of the tubular outer housing 40.

The rearmost, forwardly-facing shoulder 52 in the interior of the head housing 50 abuts a rearwardly-facing shoulder 88 on the forward portion of the outer switch housing 40 to prevent the head housing from moving forwardly relative to the outer switch housing 40.

A generally tubular member 96 is disposed between the battery casing 16 and the switch housing 14 for battery charging purposes. The member 96 has its forward end screwed into the rear end of the switch housing 40; and the rear end of the member 96 is screwed into the forward end of the battery casing 16.

A pair of mating, spaced annular insulating rings 98, 100 are disposed between the rear end of the switch housing 40 and an annular flange 102 on the tubular member 96. The annular insulating rings 98 and 100 retain an annular contact member 104. The annular flange 102 and annular contact member 104 are adapted to be placed in electrical contact with contact members of a battery charger.

The interior of the tubular member 96 retains a generally cylindrical block 108 of the insulating material; and a generally cylindrical contact member 110 extends through the center of the insulating block 108. The cylindrical contact member 110 extends longitudinally between the rear contact strip 24 in the switch assembly 14 and the forward-most rechargeable battery 112 in the battery casing 16.

A radical bore extends through the tubular contact member 96 and the insulating block 108 between the annular contact ring 104 and the cylindrical contact member 110. A diode 114, biased in a radially-outward direction by a coil spring 116 is in contact with the contact ring 104 so as to prevent electrical shorting between the contact ring 104 and the contact flange 102.

The flashlight 10 of the present invention includes a light bulb 120 which, in accordance with one feature of the present invention, is adapted to be moved forwardly (i.e., to the position shown in phantom lines in FIG. 2) and rearwardly (i.e., to the position shown in solid lines in FIG. 2).

Forward and rearward movement of the bulb 120 is accomplished by rotating the head housing 50 to rotate the camming member 80. Rotation of the camming member 80 rotates the cam surface 122 at the rear end thereof. As the cam surface 122 rotates, it either moves a cam follower 124 rearwardly, or, if the cam follower 124 is already in its rear position, rotation of the cam surface 122 will permit a coil spring 150 to urge the bulb and bulb-retainer structure axially forwardly, relative to the axially stationary parabolic reflector 70. The bulb retainer structure will now be described.

The bulb 120 has a generally annular contact flange 130 which is clamped between the forward end of a bulb retainer sleeve 132, and a retainer cap 134 which is screwed thereon.

The cam follower 124 has its threaded forward end screwed into an internally threaded bore in the sleeve 132, so that the cam follower 124 will move axially or longitudinally along with the bulb retainer sleeve 132.

The central portion of the cam follower 124 rides in a longitudinally-extending slot 138 in the sleeve 132.

A cup member 140 fits within a generally cup-shaped slot formed in the rear portion of the retainer sleeve 132. The spring 150 extends between the interior of the cup 140 and the insulator block halves 18, 20 of the switch housing to urge the cup 140, the retainer sleeve 132 and the bulb 120 in a forward direction.

The rear portion of the spring 150 is in electrical contact with the forward end of the forward contact strip 22; and a contact spring 152 extends between the forward end of the spring 150 and the bulb 120 to establish electrical contact with the contact member on the rear portion of the bulb 120. Thus, there is a continuous electrical contact path from the batteries 112, through the cylindrical contact 110, the rear contact strip 24, the annular contact flange 32, on the switch member (assuming the switch is depressed, not the position shown in FIG. 2), the forward contact strip 22, the spring 150, the contact spring 152 and the bulb 120.

A ground contact strip 160 extends between the tubular housing member 96 and the bulb retainer sleeve 132.

The rear end of the flashlight battery casing 16 is closed with a rear cover member 156 (e.g., aluminum) which is screw threaded thereon. An O-ring 158 is clamped between the cover 156 and the rear end of the casing 16 to form a seal at this juncture. A conical compression spring 170 is compressed between the cover 156 and the negative terminal of the rearmost battery 112 to hold the battery stack in electrical contact with one another and to maintain the positive terminal of the foremost battery in electrical contact with the slug 110.

The rear cover 156 houses a spare bulb 168 between two soft pads 166, 164 (e.g., of sponge rubber).

It is contemplated that the bulb 120 may be a high intensity halogen bulb which might burn a hole in the central portion of the transparent disc 72 unless precautions were taken. To prevent such an occurrence, a piece of adhesive-backed aluminum foil (or some other suitable reflective member) 190 is provided in the center of the inside surface of the lens 72.

The combination flashlight holder/charger 200 is shown in FIG. 3. The charger 200 includes a forward end cover member 202 for protecting the lens 72, a head-receiving portion 204, and a neck portion 206.

The head-receiving portion 204 receives the head 12 of the flashlight, and the neck portion 206 is adapted to receive the switch housing portion 40 of the flashlight.

An arcuate flange 208 is connected to the neck portion 206 by spring hinges (FIGS. 5 and 6) so that the housing portion 40 of the flashlight may be snapped into the neck portion 206 and retained thereby. Flanges 210, 210 are provided for securing the holder/charger to an automobile panel or other member on which it is convenient to mount the holder/charger.

The holder/charger may be electrically connected to any suitable source of electrical power (e.g., an automobile battery, not shown), via electrical coil 212.

Contact points 214, 216 are provided on the interior surface in the neck portion of the charger/holder 200 for making electrical contact with the contact ring 104 and the flange 102 of the flashlight behind the switch assembly 14.

Figure 4:
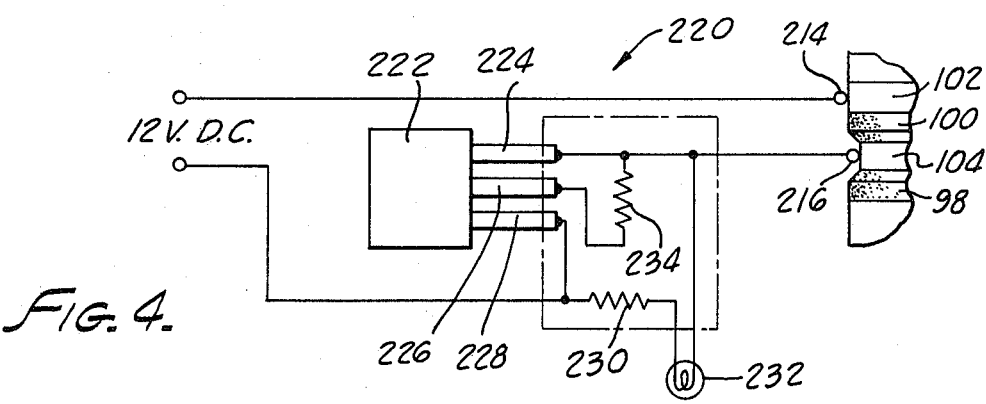
FIG. 4 is a curcuit diagram of the electric curcuit of the battery charger of FIG. 3

The charging circuit 220 of the charge/holder 200 is illustrated in FIG. 4. The charging circuit 220 includes a voltage regulator 222 having three contact prongs 224, 226, and 228 extending therefrom. One of the contact prongs 224 is connected to contact point 216; another of the contact prongs 228 is connected through a protective resistor 230 to a light-emitting diode 232 which functions as a charging indicator; and the other contact prong 226 is connected via a second protective resistor 234 to both the LED 232 and the contact point 216.

It is thus apparent that the present invention advantageously includes abutting head and outer switch housing shoulders, which prevent the camming member and light reflector, retained for movement with the head housing, from moving axially. This enables efficient axial movement of the bulb retainer sleeve and bulb, relative to the light reflector, for efficient variation of the light beam. The flashlight may be efficiently and conveniently stored in the charger/holder (e.g., in an automobile) and may have its batteries charged while so stored. The relatively small aluminum foil strip in the generally central portion of the forwardly facing surface of the lens prevents damage to the lens from heat generated by a high intensity halogen bulb.

It is contemplated that numerous modifications may be made to the flashlight and charger/holder of the preferred embodiments shown in the drawings and described above without departing from the spirit and scope of the invention. Accordingly, it is intended that the scope of this patent be limited only by the scope of the appended claims.

I claim:
1. In combination:
    a flashlight and a charger therefor;
    said flashlight including a conductive strip member and a battery compartment;
    conductive means extending between said strip and said compartment for establishing electrical connection between said strip and battery in said compartment for charging the battery; and
    a charger including a contact member for electrically contacting the said strip; and means for connecting said contact member to a source of electrical energy.
2. The combination according to claim 1, wherein said strip on said flashlight comprises a circumferential ring; and wherein said charger includes means for retaining said flashlight such that said circumferential strip contacts said contact member.
3. The combination according to claim 1, wherein the conductive means between said strip and said batery compartment includes a diode.
4. The combination according to claim 1, further comprising means for grounding the flashlight and charger.
5. The combination according to claim 4, wherein the grounding means comprise a ground and a second conductive strip member in the flashlight, second conductive means in the flashlight between said second strip and said ground, a second contact member on said charger for contacting said second conductive strip member, and second means in said charger for connecting said second contact member to a source of electrical energy.
6. A battery charger and holder mechanism including:
    a head portion for receiving the head of a flashlight and a neck portion for receiving a portion of the flashlight below the head portion of the flashlight;
    and electrical means in said holder for supplying electrical energy to batteries in the flashlight when the flashlight is in the charger/holder.
7. In a flashlight comprising:
    a body portion;
    a head portion rotatably mounted on said body portion;
    a reflector member disposed in said head portion;
    a bulb retaining member mounted for linear movement relative to said reflector member;
    cam follower means connected to said bulb retaining member;
    spring means biasing said bulb retaining member to a predetermined position;
    and cam means movable in response to relative rotational movement between said head portion and said body portion to move said bulb retaining member against the force of said spring means;
    the improvement comprising: said cam means comprising a cam member spaced from said reflector member and mounted in said head member for rotation therewith, relative to said body member and said bulb retaining member; said cam member engaging said cam follower means member;

said cam member engaging said cam follower means on said bulb retaining member;

whereby, upon relative rotation movement between said head member and said body member said cam member will move said cam follower means and said bulb retaining means in opposition to said spring means to move said bulb retaining means relative to said reflector member.

8. A flashlight according to claim 7, further including an outer switch portion, wherein said head portion and outer switch portion include abutting shoulders, which prevent axial movement of the head portion, cam structure, and reflector.

9. A flashlight according to claim 8, adapted for use with a halogen bulb, further including means for preventing heat damage to the lens from the halogen bulb.

10. A flashlight according to claim 9, wherein the lens includes an inwardly-facing surface, and said damage preventing means comprise a relatively small strip comprised of aluminum foil secured to the inwardly-facing surface of the lens.

11. A flashlight comprising:
 a generally cylindrical casing having a longitudinal axis, a forward end portion and a rear end portion;
 a reflector support member rotatably mounted on said forward end portion of said casing;
 a reflector structure secured to said reflector support member;
 said reflector structure having a central opening adapted to receive a light bulb therethough;
 a reflector surface extending axially forwardly and radially outwardly from said opening;
 a generally tubular cam structure, extending rearwardly of said reflector central opening, connected to said reflector support member and terminating in a rear cam edge which lies substantially in a plane which is inclined relative to the longitudinal axis of said cylindrical casing;
 a guide sleeve mounted within said casing;
 means defining an axially extending guide slot in a portion of said guide sleeve;
 a bulb carrier sleeve slidably disposed in said guide sleeve for axial movement relative thereto, said bulb carrier sleeve having a forward end portion;
 a light bulb member removably secured in the forward end portion of said bulb carrier sleeve;
 a cam follower member secured to said bulb carrier sleeve and extending radially outwardly therefrom;
 said cam follower member being slidably disposed in said axially-extending guide slot in said guide sleeve so as to permit axial sliding movement of said cam follower member and bulb carrier sleeve and light bulb member relative to said guide sleeve;
 a switch housing mounted within said casing;
 a conductor strip mounted within said switch housing;
 a coiled compression spring disposed between said conductor strip and said bulb carrier sleeve for urging said bulb carrier sleeve forwardly in said central opening of said reflector structure;
 said cam follower member on said bulb carrier sleeve in which said light bulb member is mounted functioning, in conjunction with said guide slot in said guide sleeve, to define the forward and rearward limits of axial movement of said light bulb structure;
 a contact element secured in said forward end portion of said interior guide sleeve;
 said conductive contact element being adapted to receive a contact portion of said light bulb structure; and
 an interior compression spring dispoed within said bulb carrier sleeve and extending between said conductor strip and said inner coiled spring, in the medial portion of said bulb carrier sleeve, to establish electrical contact between said conductor strip in said switch housing and said light bulb member.

* * * * *